July 24, 1962  C. G. ALT  3,045,439
GRID AND PLATEN ICE MAKING
Filed July 5, 1960  4 Sheets-Sheet 1

INVENTOR.
CARL G. ALT
BY
*Herman Seid*
ATTORNEY.

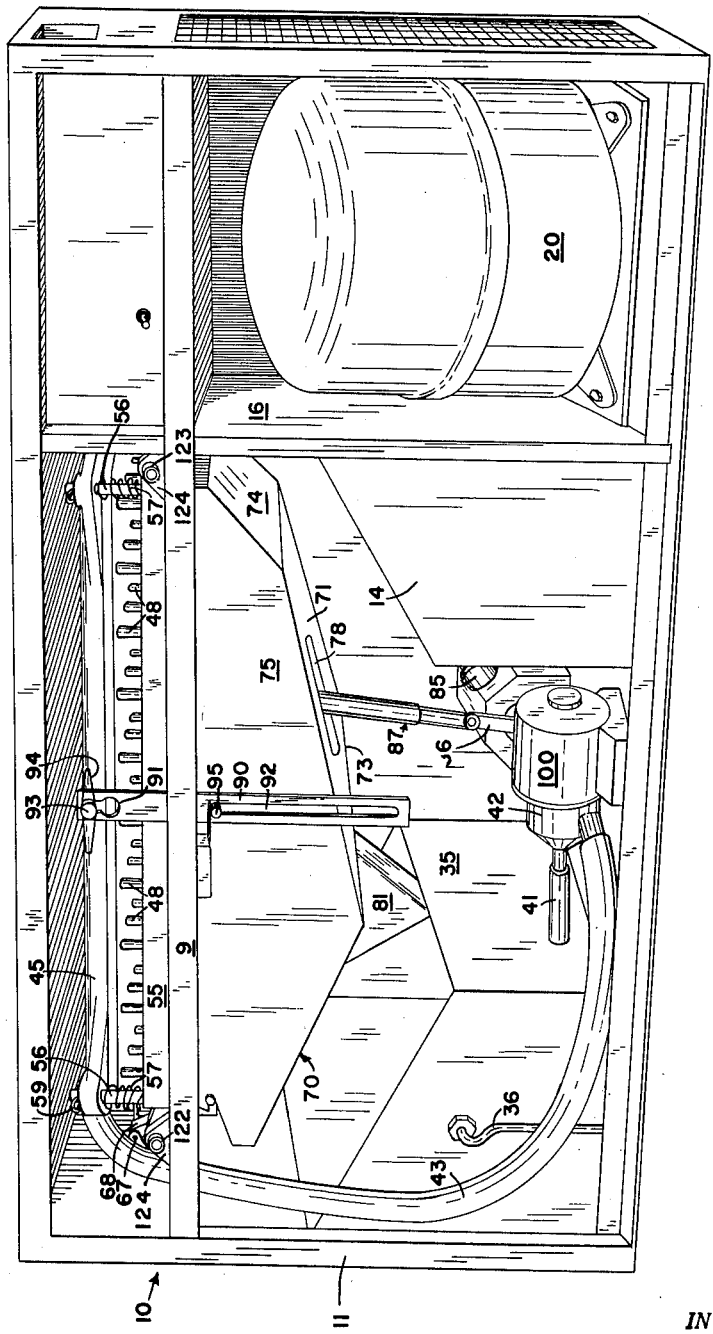

July 24, 1962

C. G. ALT 3,045,439

GRID AND PLATEN ICE MAKING

Filed July 5, 1960

INVENTOR.
CARL G. ALT

BY *Herman Seid*

ATTORNEY.

United States Patent Office 3,045,439
Patented July 24, 1962

3,045,439
GRID AND PLATEN ICE MAKING
Carl G. Alt, Syracuse, N.Y., assignor to Carrier Corporation, Syracuse, N.Y., a corporation of Delaware
Filed July 5, 1960, Ser. No. 40,718
5 Claims. (Cl. 62—66)

This invention relates to ice forming, more particularly to novel apparatus, and methods implementing the collection of excess water and the discharge of formed ice from the grid of an ice making machine so that a relatively constant supply of uniformly shaped clear pieces of ice will be produced.

A variety of situations exist in which it is desired to have available a relatively constant supply of ice. Thus in various commercial food establishments it is necessary to provide a relatively large supply of ice for chilling of food. In most such establishments whether restaurants, bars, or the like the ice supply should be continuous and any ice served with food should generally be of a shape to facilitate handling and provide a desired aesthetic effect. To this end equipment for forming various shapes of ice bodies has been utilized. Of the various shapes, however, the so-called ice cube is found most preferable.

In conventionally forming ice cubes, a grid containing a plurality of cube shaped cells is generally employed. Water is fed to the cells of the grid, and the water is frozen in the cells, after which the frozen water is released from the cells to provide the desired ice cubes. The broad general principle of freezing water in a cube-shaped cell is old in the art. However, a number of problems arise in connection with existing apparatus and procedures.

Thus it is found that a number of difficulties arise in effecting release of the formed ice cubes from the grid and directing same to a desired collection point. In order to attain a clear ice piece it is preferred to agitate the water supplied to the grid. This is most readily effected by supplying water to the grid in excess of the volumetric capacity of the cells so that there will be an overflow of water resulting in turbulence within the cells.

In addition to the problem of distributing the water to the grid, it is of course necessary to make provision for the return of excess water to any supply sump so as to prevented undesired wetting of the apparatus components, and so as to minimize water losses.

It is with these problems and desiderata in mind, that the present means have been evolved, means including both apparatus and method providing for the formation of a plurality of uniformly shaped clear ice pieces by the use of a grid containing cells of desired shape. The novel means serve to collect any excess water for return to the water supply.

It is accordingly a primary object of this invention to provide novel ice forming means including both apparatus and method.

A further object of the invention is to prevent water which is supplied to the ice forming grid from splashing over other of the apparatus components.

An additional object of the invention is to provide a water supply system for ice forming equipment in which losses of refrigeration effects on the water are maintained at a minimum.

It is also an object of the invention to provide novel means for preventing water losses in directing water to an ice forming grid.

These, and other objects of the invention which will become hereafter apparent, are attained by providing an ice forming apparatus having a grid containing a plurality of cells confining a volume having a configuration like that of the ice to be formed. A compression refrigeration system is employed to refrigerate the cells of said grid and this is effected by arranging at least a portion of the evaporator of said compression refrigeration system within a movable platen arranged in heat exhange relationship with the cells of said grid. This movable platen serves the threefold function of closing off the cells of the grid to retain water therein, directing refrigerant into heat exchange relationship with the water retained in said cells, and deflecting the formed ice after harvesting to a collection and storage point in a bunker beneath the grid. A water supply system is provided directing water to the cells of the grid for freezing into the requisite ice bodies.

A water collection pan mounted beneath the grid collects excess water and returns same to the sump. This water collection pan is formed with a trough member having an upwardly extending front lip which is always above the bottom of the trough, whereby water will always be retained in the trough during movement of the pan. A discharge spout leads the collected water from the trough to the sump so as to permit recirculation of this cooled water to the grid. Splash guards are removably mounted on the sides of the pan and extend upwardly to the header so as to insure the collection of any water splashed by the header in said trough.

An important feature of the invention resides in the provision of a novel water collecting pan in which the front lip on the trough forming the pan is arranging to retain water in the pan even when the pan is moved, and removable splash guards are arranged to recover any water splashed during delivery to the grid.

These novel features, and the novel structural components and their mode of functioning, will be made most manifest and particularly pointed out in clear, concise and exact terms in conjunction with the accompanying drawings, wherein:

FIGURE 2 is a front perspective view looking upwardly at the water supply components and ice making components of the apparatus shown in FIGURE 1;

Referring now more particularly to the drawings, like numerals in the various figures will be employed to designate like parts.

Figure 1:
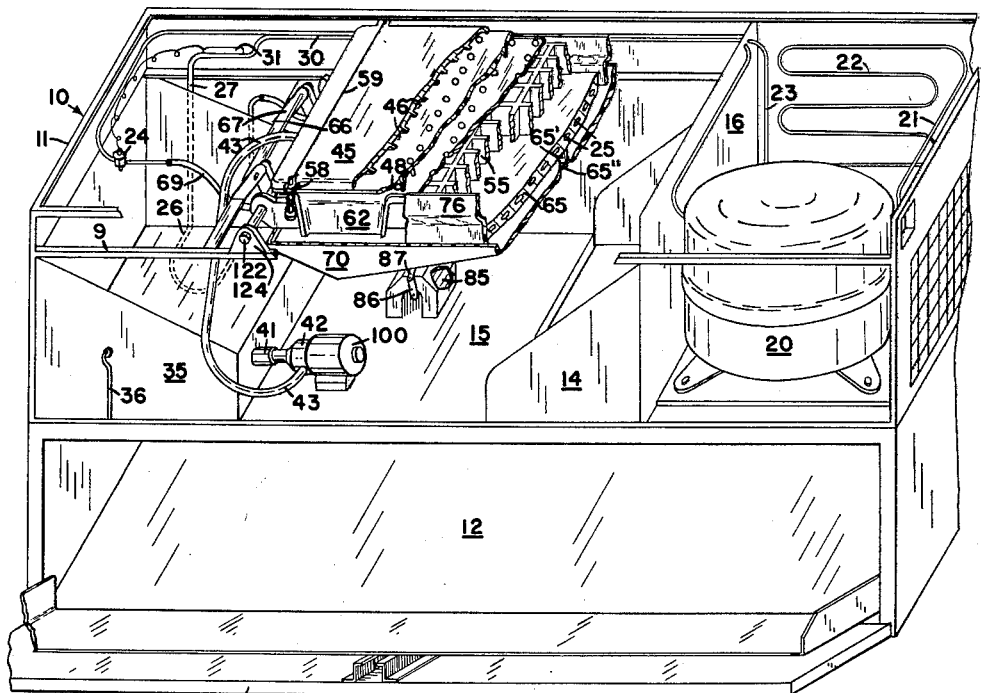
FIGURE 1 represents a perspective view, with parts broken away, of the novel ice making apparatus incorporating the features of this invention.

As best seen in FIGURE 1, the novel ice making apparatus 10 is shown arranged within a rectangular housingn 11 formed of sheet metal, or the like relatively rigid sheet material supported on a framework 9 of angle irons, or the like. A bunker 12 is formed at the bottom of the housing 11, and provided with a hinged door 13 permitting access to the interior of bunker 12. Leading to the bunker is a chute 14 extending from an opening in horizontal partition 15 arranged above the bunker 12. Vertical partition wall 16 extends upwardly from horizontal partition 15 and separates the heat dissipating components of the refrigeration system, to be hereinafter described, from the ice forming equipment, and the water supply equipment, as seen to the left in FIGURES 1 and 2.

Figure 6:
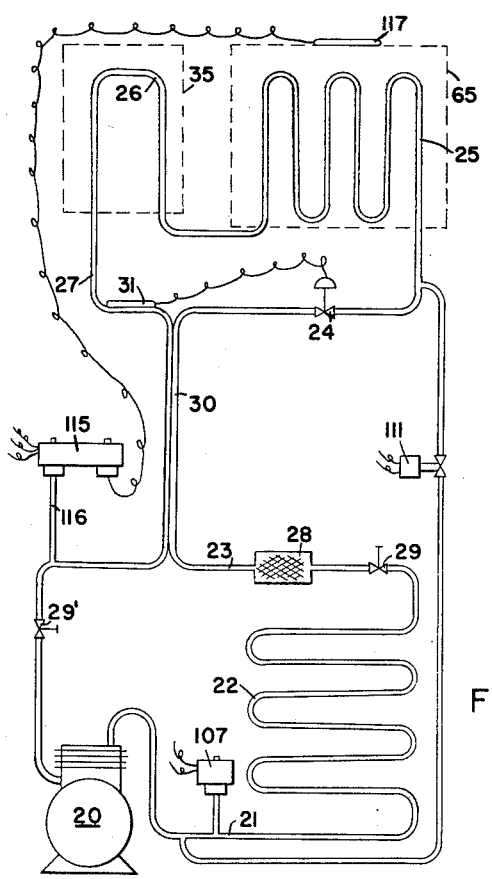
FIGURE 6 is a schematic diagram of the refrigeration system employed in the novel apparatus.

The refrigeration system employed as best seen in FIGURES 1 and 6 comprises a compressor 20 constituted by a sealed motor compressor unit such as is conventionally employed in compression refrigeration systems. The compressor 20 is coupled via discharge line 21 to condenser 22 which is connected via liquid line 23 through expansion valve 24 to primary platen evaporator 25 in series with secondary water pre-cooling evaporator 26, from which suction line 27 extends back to compressor 20. It will be observed that portions of liquid line 23 and suction line 27 are arranged in heat exchange relation as shown at 30.

Expansion valve 24 is controlled by means of thermostatic bulb 31 arranged in heat exchange relationship with suction line 27 so that the amount of refrigerant flowing from the condenser 22 to the evaporator is regulated in response to temperature of refrigerant in the suction line. A conventional strainer-dryer 28 and a discharge service valve 29 may be placed in liquid line 23. Suction service valve 29' may be provided in line 27. The other details of the control circuit will be hereafter more fully described.

Figure 7:
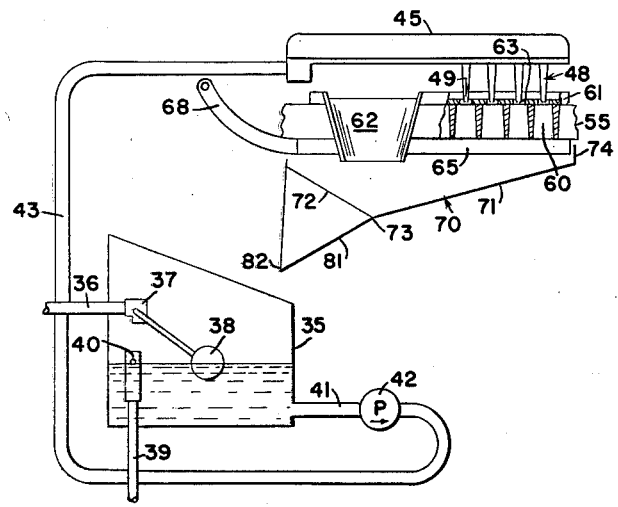
FIGURE 7 is a schematic diagram of the water supply system.

The water supply circuit here employed as best seen in FIGURES 1 and 7 includes a water storage sump 35 to which water is fed by water main connection 36 which feeds water to sump 35 through float controlled valve 37, the opening of which is regulated by the position of float 38 in the sump 35. Overflow pipe 39 formed with siphon cap 40 is arranged in the bottom of the sump to insure that the water level in the sump will not exceed a desired maximum. Sump discharge line 41 leads the water from the sump through pump 42 via flexible water header supply line 43 to water distribution header 45.

Figure 3:
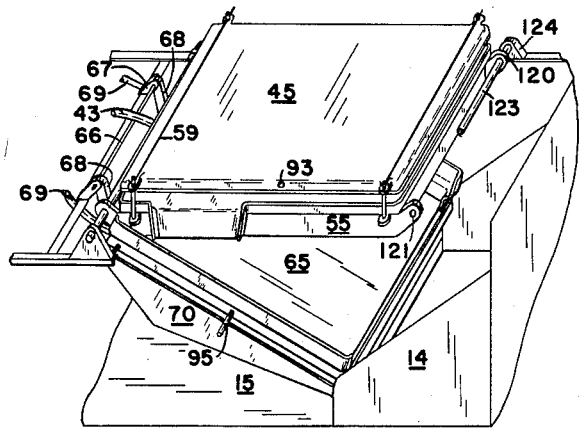
FIGURE 3 is a perspective detail view looking downwardly on the water distribution header, the grid, the evaporator platen, and the water collection pan, shown during the harvesting cycle of the apparatus of FIGURE 1.
Figure 4:
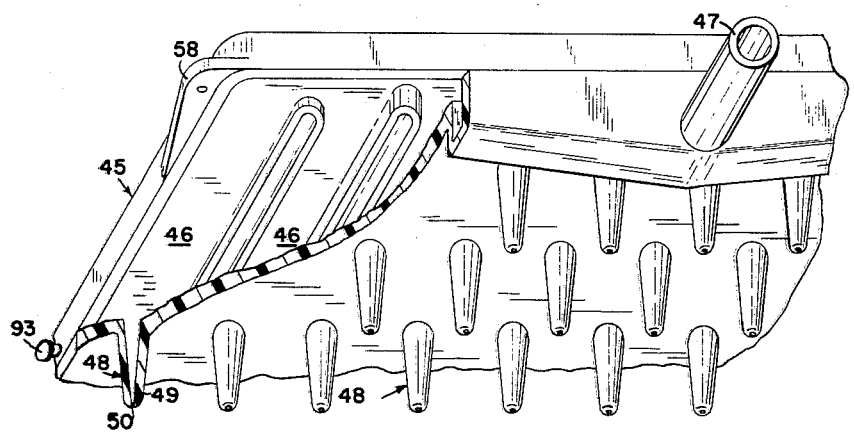
FIGURE 4 is a perspective view, with parts broken away, of the water distribution header.

Water header 45 as best seen in FIGURES 3 and 4 is formed in a plate-like configuration with a plurality of distribution channels 46 arranged to direct water from header inlet 47 to a plurality of spaced ejector nozzles 48. The water header 45 is formed of a suitable relatively rigid material preferably by molding or the like technique implementing the formation of a closed hollow plate-like member in which a plurality of distribution channels may readily be formed. The shape of the channels, and the shape of the internal cross section of the nozzles 48 is such as to provide a relatively uniform distribution of water pressure throughout the header 45 so that the flow of water from each of the nozzles is substantially the same.

Each of ejector nozzles 48 is formed with a nose portion 49 having an orifice 50 at the tip thereof. The water header 45 is slidably mounted with respect to grid 55 by means of pins 56 arranged at the respective corners of the header 45. The pins 56 extend slidably through apertures in corner ears 58 formed on the header 45 and these pins are fixed at their lower ends in the corners of grid 55 with the keeper rods 59 limiting upward movement of header 45. Compression springs 57 are arranged about pins 56 between the header 45 and grid 55 to bias the header 45 upwardly away from the grid as viewed in FIGURES 1 and 2.

Grid 55 is fixedly mounted with respect to housing 11. An ear 120 is secured to each corner of the grid. Each ear has an opening 121 therein. Support rods 122 and 123, which are mounted in brackets 124 secured to the framework 9, extend through the openings 121 and support grid 55.

Grid 55 is formed with a plurality of cells 60 which confine a volume having a configuration like that of the ice bodies to be formed. As previously noted, the rectilinear configuration commonly called an "ice cube" is preferred, and to this end the grid 55 is formed with a plurality of cube like cells so that any water frozen therein will be formed into these so called ice cubes. Grid 55 as best seen in FIGURES 1 and 7 is formed with a water deflection plate or tray 61 arranged to extend over the top surface thereof. Overflow lip 62 is formed on one end of the deflection tray to direct any excess water downwardly over the side of grid 55 in a fashion to be hereinafter more fully described. A plurality of apertures 63 is arranged coaxially with the center line through each of the cells 60 and as viewed in FIGURES 1 and 7, it will be observed that the apertures 63 are of a size to permit the ejector nozzles employed to supply water to the grid cells to pass therethrough.

However, in the pre-harvesting, or ice-forming position shown in FIGURE 7, only the nose portions 49 of nozzles 48 are arranged within aperture 63, so that there is a clearance between the apertures 63 and nose portion 49, whereby water may flow through said clearance for a purpose to be made hereinafter more apparent. The water deflection tray 61 may be suitably formed of any readily formable sheet material, but is preferably formed of a strong, light weight plastic, such as styrene copolymer.

Platen 65 is pivotally mounted on pivot rod or shaft 66 extending through bearing fulcrum 67 provided on framework 9. Ears 68 are extended upwardly and outwardly from the plane of platen 65 and are secured on shaft 66 so that the plate 65 may lie flush against the bottom of grid 55 as viewed in the drawings, but may also pivot about an axis through rod 66 as viewed in FIGURE 3 to permit those portions of the platen in contact with the grid to move a distance at least equal to the height of an ice cube away from the grid to permit discharge of the formed ice. The platen 65 is of a plate-like configuration substantially coextensive with the bottom area of grid 55, and is preferably formed with a serpentine passageway so as to accommodate the tubing employed in fabricating evaporator 25 as seen in FIGURE 6. The portion of evaporator 25 arranged within the serpentine passageway in platen 65 is connected to the refrigeration system by flexible refrigerant conduits 69 so as to permit movement of the platen containing primary evaporator 25 with respect to the relatively fixed refrigeration system components. The top surface of the platen 65 is sufficiently smooth to provide relatively contiguous surface engagement with the bottom of grid 55 whereby the cells 60 will be closed off to retain water therein when the platen 65 is in its upward position as illustrated in FIGURES 1 and 7.

Figure 5:
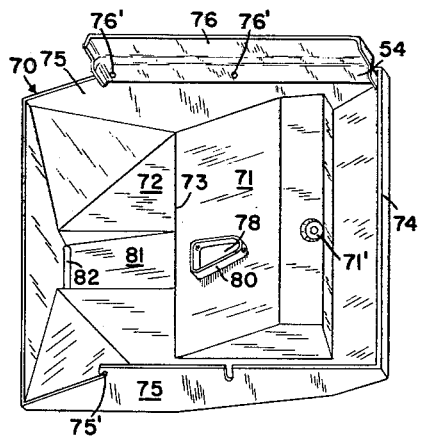
FIGURE 5 is a top perspective view of the water collection pan.

Positioned beneath grid 55 and platen 65 is a water collection pan 70 as best seen in FIGURES 2, 5 and 7, formed with a bottom trough having a front downwardly and rearwardly inclined bottom plate 71 and a rear forwardly and downwardly inclined bottom plate 72 converging along a low point line 73 which forms a low point in the pan 70. Front wall 74 is upstanding from the leading edge of bottom plate 71. Side walls 75 extend along the sides of the trough to enclose same to form pan 70 as viewed in FIGURE 5.

Means are provided to connect the water collection pan to the platen 65. Bottom plate 71 has an opening 71' therein through which stud 65', rigidly affixed to the bottom of platen 65, extends. Nut 65" fastened on the stud 65' beneath bottom plate 71, secures the bottom plate to the platen. Each side wall 75 has a hook portion 75' which engages a bolt 75" connected to the platen.

Splash guards 76 are removably secured to platen 65 and extend upwardly therefrom a distance permitting the splash guards to enclose the water deflection tray 61 as viewed in FIGURE 1, whereby any water passing over overflow lip 62 will be deflected to pan 70. Splash guards 76 also direct harvested ice bodies to the ice chute 14. Bolt 75" and headed pin 93 extend through openings 76' in the splash guards 76 and are detachably connected to the platen.

The front bottom plate 71 of pan 70 is formed with opening 78 surrounded by lip 80 which extends completely thereabout for a purpose to be made hereinafter more apparent. Discharge spout 81 extends downwardly from low point line 73 to discharge opening 82 whereby water collected in said pan 70 may be discharged to the sump 35 as viewed in FIGURES 2 and 7.

Supported on partition 15 above bunker 12 is a gear motor 85 having a crank arm 86 coupled to connecting rod 87 which extends upwardly through aperture 78 and is connected to platen 65, whereby operation of the motor will cause the platen to move downwardly pivoting about pivot rod 66, as viewed in FIGURE 2. The connecting rod 87 is formed as a telescoping member with a spring (not shown) arranged between the upper and lower telescoping parts of the connecting rod whereby a cushioning effect is obtained in the event that the motion of the connecting rod is obstructed.

A strap 90, as best seen in FIGURE 2 is secured between header 45 and platen 65 on opposite sides of each for a purpose to be made hereinafter more apparent. Strap 90 is formed with an upper keyhole pivot slot 91 and a lower lost motion slot 92. Headed pin 93 is extended from header 45 into keyhole slot 91 and suitably secured therein by hairpin spring 94. Lost motion slot 92 engages pin 95 secured to platen 65.

Figure 8:
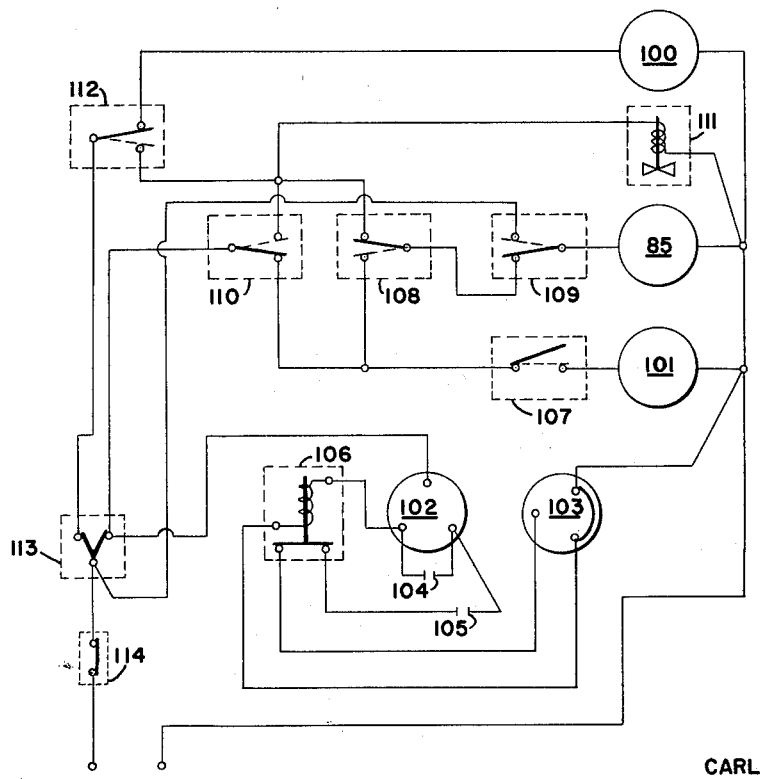
FIGURE 8 is a schematic circuit diagram of the controls.

The control circuit diagram illustrated in FIGURE 8 includes a pump motor 100 employed for driving pump 42, gear motor 85, and condenser fan motor 101 utilized for driving the condenser fan to direct air into heat exchange relationship with condenser 22 of the refrigeration system here employed. The circuit also includes the compressor motor 102, the overload relay 103, the running capacitor 104, the starting capacitor 105 and starting relay 106. Pressure sensitive fan cut-out switch 107 is arranged in the fan motor circuit. Gear motor switch 108 is arranged in the gear motor circuit along with manual control gear motor switch 109. Temperature and pressure sensitive defrost control switch 110 is arranged in a circuit with the relay of defrost solenoid valve 111 and fan motor 101 as best seen in FIGURE 8. Control 115 shown in FIGURE 6 contains switch 110. The control is connected to suction line 27 by line 116 so as to be responsive to the pressure of the refrigerant flowing through line 27 to move switch 110 to the position shown in dotted line in FIGURE 8 to terminate the freezing cycle and initiate defrosting. The control is connected to thermostatic bulb 117 so as to be responsive to a predetermined temperature indicative of the completion of defrosting to move switch 110 to the position shown in solid line in FIGURE 8 to initiate harvesting of the ice cubes. Harvest control switch 112 is arranged to control the flow of current to gear motor 85, and main power switch 113 is arranged to control the energization of the aforedescribed circuit components.

Bunker switch 114 is arranged to deenergize all the components of the electrical control system when a predetermined quantity of ice is collected in the bunker 12.

In use, the ice forming apparatus here provided is intended for the relatively continuous production of ice bodies such as would be required in a commercial eating establishment. The ice bodies formed by the instant apparatus are as noted the so-called ice cubes. Installation of the apparatus is possible in any area permitting connection to a water supply main and an electrical power supply source.

Water is supplied from the main to sump 35 in a quantity such as to fill the sump to a level determined by the adjustment of flow control valve 37. When this level has been attained float 38 rises, shutting valve 37, and the supply of water to sump 35. Water pump 42 directs the water from sump 35 to header 45 via flexible water supply line 43. The flexibility of water supply line 43 permits movement of header 45 with respect to water pump 42 for a purpose to become hereinafter more apparent.

In header 45, the water is distributed from inlet 47 as viewed in FIGURE 4 through channels 46. As noted, the dimensioning of the header channels 46 is such as to provide for a uniform pressure at each of the nozzles 48. The water in channels 46 is ejected from the header to the grid via ejector nozzles 48 where it will be observed that the infundibular cross-section of the nozzle as viewed in FIGURE 4 provides for a velocity increase at the orifice 50 in nose portion 49 as the water leaves the header for distribution in cells 60 of grid 55.

The water flowing into cells 60 is agitated as a result of the turbulence produced by the action of ejector nozzles 48 directing water into the cells 60 confined by water plate 61. Any overflow resulting from this turbulence is directed outwardly through the space between the nozzle nose portion 49 and the apertures 63 in plate 61. The overflow through these apertures 63 drains downwardly to overflow lip 62 whence it is directed to water collection pan 70. It will be observed that the amount of water supplied to cells 60 is in excess of the amount of water frozen during any given period of time so that there will always be an overflow along plate 61. This excess water flow agitates the water in the cells, and though interfering slightly with the rate of ice formation, serves to eliminate from the formed ice any foreign matter whether solid or gaseous since the cleaner water tends to freeze first and the overflow serves to remove the foreign matter, and the agitation releases undesirable gases.

Water collection trough or pan 70 is formed in a novel fashion whereby cleaning of the trough components is implemented and substantially all the water supplied to the grid, and not frozen is returned to the sump without wetting of the apparatus components. The splash guards 76, which are removable for cleaning purposes, serve to deflect any water flowing over plate 61 downwardly to pan 70 thus preventing wetting of the other apparatus components due to splashing as a result of the turbulence in cells 60. Splash guards 76 also serve to direct harvested ice bodies to the ice chute 14. The configuration of pan 70 is such that even in the harvesting position shown in FIGURE 3 low point line 73 is below the top of front wall 74 whereby water is still drained downwardly to the sump via spout 81 thus maintaining the apparatus components in a relatively dry condition. Appropriate filters are of course arranged in the sump inlet and outlet so as to remove any impurities.

The refrigeration system here provided permits simple and effective cooling of the water retained in the cells of grid 55 by utilization of an evaporator coil 25 arranged within platen 65. When the refrigeration system is operating, the evaporating refrigerant passing through the primary evaporator 25 and secondary evaporator 26 of the refrigeration system serves to cool any water in the cells and in the sump respectively which are in heat exchange relationship with said evaporators. The arrangement of the evaporator within platen 65 is a relatively simple matter eliminating the problems heretofore encountered in attempting to arrange the evaporator coils within the grid structure itself. The platen functions to retain water within the cells 60 of the grid and to direct refrigerant from the refrigeration system into heat exchange relationship with the water retained in said cells to freeze same. During the freezing operation, platen 65 is in the position illustrated in FIGURES 1 and 2 where it is held under spring pressure by connecting rod 87. During the operation of the refrigeration system, the evaporating refrigerant flowing through the platen 65 serves to freeze the water retained in cells 60. The refrigerant flowing through secondary evaporator 26 arranged in heat exchange relationship with sump 35 either in the water or in the sump wall serves to chill the water in the sump prior to its distribution to cells 60, whereby the time required to effect freezing of the water is diminished.

After the cells 60 are filled with ice, the ice is freed from the cells by directing hot refrigerant from compressor 20 to coils 25 which results in a breaking of any bond between the ice and the walls of cells 60. There-after harvesting of the ice is accomplished by energizing motor 85, lowering platen 65 to the position illustrated in FIGURE 3 in which the free edge of platen 65 assumes a position over chute 14 and the platen edge closest to the shaft 66 has moved a distance at least equal to the height of a cube whereby sufficient clearance exists to permit the ice cubes released from the cells of the grid to fall onto the platen for direction to bunker 12. Simultaneously with the lowering of platen 65 to its lowermost position for a short part of its movement before reaching its bottom point, pin 95 engages the bottom of slot 92, pulling strap 90 downwardly against the action of springs 57, forcing the nose portions 49 of ejector nozzles 48 against the ice in cells 60, whereby any ice cubes remaining in the grid are positively ejected from the cells onto platen 65. It will be observed that the platen limits the distance through which the ice cubes must fall and serves to guide same in a relatively non-jarring fashion into bunker 12 whereby spalling of the cubes is maintained at a minimum.

After harvesting, the platen is again raised to the position illustrated in FIGURES 1 and 2, and the cycle of operation is re-initiated. During the formation of the next batch of cubes, those previously formed harvested cubes are available for use in bunker 12 which is appropriately insulated.

The aforedescribed cycle of operation may be automatically attained by utilizing a control circuit such as shown schematically in FIGURE 8. When apparatus operation is initiated, the control arms of main power switch 113 are positioned to engage both contacts as indicated in the drawing. For cleaning the apparatus, only the left hand contact is closed. In the off position, both contacts are open. The switch arms of the other switches are then in the position indicated by solid line in the drawing, under which circumstances the compressor motor 102, and pump motor 100 are actuated; fan motor 101 is inoperative; gear motor 85 is inoperative, and solenoid valve 111 is closed. As the compressor operates the pressure within the refrigeration system will build up and at a predetermined head pressure the arm of switch 107 will be closed, energizing the circuit to the fan motor 101. After the ice has been formed in the cells of the grid, the refrigerant pressure in the evaporator drops. This drop in pressure is sensed by control 115 and the arm of temperature and pressure sensitive defrost control switch 110 moves to the dotted line position closing the circuit to the relay of solenoid valve 111 opening the hot gas line from condenser 22 to primary evaporator 25 as viewed in FIGURE 6 and opening the circuit to the condenser fan motor 101, stopping the fan motor. Gear motor 85 is simultaneously actuated to move a cam causing the arm of gear motor switch 108 to move to the dotted line position, whereby the gear motor 85 is stopped with platen 65 still contacting the grid and maintaining the hot refrigerant gas flowing through the primary evaporator in heat exchange relationship with the grid cells to effect defrosting. When thermostatic bulb 117 senses a temperature indicative of the completion of defrosting, the control 115 is actuated and the arm of the switch 110 moves back to the solid line position. Motor 85 is energized to lower the platen causing ejection of the ice cubes and to raise the platen to the freezing position as aforedescribed. As the platen lowers, switch 112 moves to the position shown in dotted lines, stopping pump motor 100. As the platen returns to a position sealing the cells of the grid, switch 112 is moved to the position shown in solid line, restarting pump motor 100. Immediately after switch 112 is tripped to the position shown in solid line a cam on gear motor 85 moves the arm of switch 108 to the solid line position, stopping gear motor 85. All the switches are now in the normal freezing position and the freezing cycle is reinitiated. When a predetermined quantity of ice is collected in the bunker, switch 114 is opened to deenergize the control circuit.

Though a complete ice forming machine has been disclosed embodying the instant inventive concept, it will be understood by those skilled in the art that the invention may be employed in conjunction with a variety of other ice forming apparatus. The instant invention resides in the novel liquid collection trough and its mounting with respect to the platen.

The above disclosure has been given by way of illustration and elucidation, and not by way of limitation, and it is desired to protect all embodiments of the hereindisclosed inventive concept within the scope of the appended claims.

I claim:

1. In an ice making machine having a grid containing a plurality of cells open on the bottom thereof within which liquid may be confined in a volumetric configuration of the shape of the ice to be formed, a movable platen beneath the grid adapted to close the bottoms of the cells of the grid to confine liquid within the cells, a sump containing liquid to be frozen, supply means directing liquid to be frozen to the cells from the sump, means for returning excess unfrozen liquid from the grid to the sump connected to said platen, said returning means comprising: means directing the excess liquid to a lowermost collection point; retaining means maintaining the excess liquid at the collection point; and discharge means leading the collected liquid from the collection point to the sump for returning the collected liquid to the sump regardless of the position of the movable platen.

2. In an ice making machine having a grid containing a plurality of cells open on the bottoms thereof within which liquid may be confined in a volumetric configuration of the shape of the ice to be formed, a platen movable from a position closing the bottoms of the cells to a position permitting discharge of the ice from each of the cells, and having liquid supply means directing liquid to be frozen to the cells from a sump, apparatus for returning excess unfrozen liquid from the grid to the sump in all positions of said platen, said apparatus comprising: a liquid collection trough connected to the movable platen, said trough having two downwardly inclined converging lower surfaces forming a lowermost collection point therebetween; a lip upstanding from one end of one of said surfaces acting to retain liquid in said trough; and a discharge spout extending downwardly from the other of said surfaces beneath the level of the line of convergence of said surfaces.

3. An ice making machine as in claim 1, in which opposed upwardly extending side walls are extended transversely from the line of convergence of said bottom walls; and splash guards are removably secured adjacent said side walls and upstanding therefrom, whereby splashed liquid will be directed to said trough for discharge to the sump.

4. In an ice making machine, a grid containing a plurality of refrigerated cells within which a liquid to be frozen may be confined and frozen to form ice of a desired configuration, a platen movable from a first position confining liquid within said cells to a second position, a sump containing liquid to be frozen, means for supplying liquid to the cells of the grid comprising distribution means directing liquid to be frozen into the tops of the cells of the grid and collecting means secured to the platen and arranged beneath the grid to collect any unfrozen liquid supplied to the cells of the grid and to return such unfrozen liquid to the sump regardless of the position of the movable platen, whereby the components of the ice making machine which are to be kept dry will not be wet.

5. A method of collecting unfrozen liquid fed to the grid of an ice making machine comprising a grid containing a plurality of cells open on the bottoms thereof and a movable platen adapted to close the bottoms of the cells to permit return of unfrozen liquid to the supply sump from which the liquid is supplied to the grid, said method comprising the steps of: directing the unfrozen liquid downwardly from the grid to a lowermost movable collection point; retaining the liquid at said lowermost collection point; collecting any splashed liquid; deflecting the splashed liquid to the collection point; and discharging substantially all of the unfrozen liquid to the sump in all positions of the movable collection point.

References Cited in the file of this patent

UNITED STATES PATENTS

| | | |
|---|---|---|
| 2,586,588 | Weseman | Feb. 19, 1952 |
| 2,723,536 | Mason | Nov. 15, 1955 |
| 2,746,262 | Gallo | May 27, 1956 |
| 2,763,993 | Bayston | Sept. 25, 1956 |
| 2,866,322 | Muffly | Dec. 30, 1958 |
| 2,940,276 | Lowenthal | June 14, 1960 |

UNITED STATES PATENT OFFICE
CERTIFICATE OF CORRECTION

Patent No. 3,045,439             July 24, 1962

Carl G. Alt

It is hereby certified that error appears in the above numbered patent requiring correction and that the said Letters Patent should read as corrected below.

Column 1, line 45, for "prevented" read -- prevent --; column 2, line 27, for "arranging" read -- arranged --; lines 61 and 62, for "housingn" read -- housing --; column 4, line 58, after "pan" insert -- 70 --; column 8, line 48, for the claim reference numeral "1" read -- 2 --.

Signed and sealed this 18th day of December 1962.

(SEAL)
Attest:

ERNEST W. SWIDER             DAVID L. LADD
Attesting Officer             Commissioner of Patents